United States Patent

Fischer

[11] Patent Number: 6,086,090
[45] Date of Patent: Jul. 11, 2000

[54] VEHICLE STEERING WHEEL WITH INTEGRATED GAS BAG MODULE

[75] Inventor: Anton Fischer, Leinweiler, Germany

[73] Assignee: TRW Occupant Restaint Systems GmbH & Co. KG, Alfdorf, Germany

[21] Appl. No.: 09/186,992

[22] Filed: Nov. 5, 1998

[30] Foreign Application Priority Data

Nov. 12, 1997 [DE] Germany ............... 297 20 079 U

[51] Int. Cl.$^7$ .................. B60R 21/08; B60R 21/16
[52] U.S. Cl. .............. 280/728.2; 280/731; 200/61.55; 200/61.56
[58] Field of Search ................ 280/728.2, 731, 280/730.1; 200/61.54, 61.55, 61.56, 61.57

[56] References Cited

U.S. PATENT DOCUMENTS

| | | | |
|---|---|---|---|
| 3,887,215 | 6/1975 | Albrecht et al. | 280/730.1 |
| 4,325,568 | 4/1982 | Clark et al. | 280/731 |
| 4,785,144 | 11/1988 | Fosnaugh et al. | 200/61.55 |
| 5,193,412 | 3/1993 | Hashiba | 200/61.54 |
| 5,338,906 | 8/1994 | Yokota | 200/61.54 |
| 5,730,459 | 3/1998 | Kanda | 280/731 |
| 5,950,494 | 9/1999 | Sugiyama | 200/61.55 |

*Primary Examiner*—Eric Culbreth
*Assistant Examiner*—Hau Phan
*Attorney, Agent, or Firm*—Tarolli, Sundheim, Covell, Tummino & Szabo L.L.P.

[57] ABSTRACT

A vehicle steering wheel has an integrated gas bag module comprising an inflator, a folded gas bag and a cover connected to each other by a metallic housing body, and a mounting plate featuring at least one electrically insulated horn contact. The mounting plate is spring supported on said steering wheel body and carries said gas bag module whilst being an integral component of said housing body and thus a component of said gas bag module. To simplify the configuration and the fitting of a vehicle steering wheel having an integrated gas bag module, a plurality of seats for one coil spring each are arranged on said steering wheel body opposite the outer rim portion of said mounting plate, the latter being spring supported by said coil springs on said steering wheel body.

12 Claims, 1 Drawing Sheet

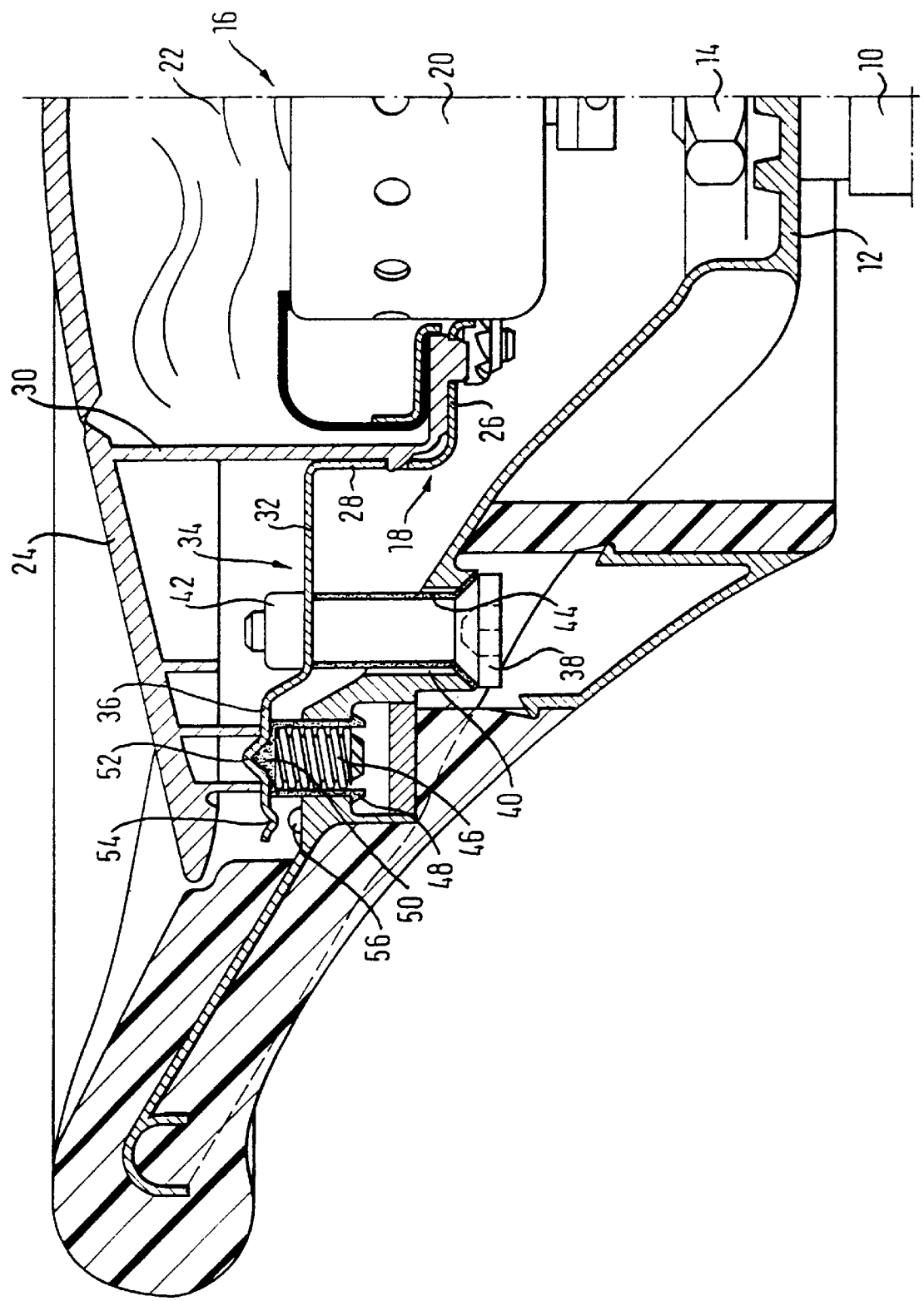

VEHICLE STEERING WHEEL WITH INTEGRATED GAS BAG MODULE

FIELD OF THE INVENTION

The invention relates to a vehicle steering wheel, with an integrated gas bag module comprising an inflator, a folded gas bag and a cover connected to each other by a metallic housing body, with a mounting plate featuring at least one electrically insulated horn contact, the mounting plate being spring supported on the steering wheel body and carrying the gas bag module whilst being an integral component of the housing body and thus a component of the gas bag module.

BACKGROUND OF THE INVENTION

Vehicle steering wheels of this kind are known. For springably supporting the mounting plate on the steering wheel body, coil springs or disks of an elastic material are provided surrounding the fastener screws or studs concentrically so that these need to be threaded into each other for fitting the mounting plate. In addition the mounting plate needs to be aligned for fitting so that the fastener screws or studs can engage the associated mounts. The fastener screws or studs themselves are guided by bushes of an insulating material arranged in the mounting plate or the steering wheel body to ensure the horn contacts on the mounting plate are electrically insulated from the steering wheel body, the horn contacts being formed by contact elements mounted on the mounting plate or steering wheel body.

SUMMARY OF THE INVENTION

The intention of the invention is to simplify the configuration and the fitting of a vehicle steering wheel having an integrated gas bag module.

For this purpose in accordance with the invention a vehicle steering wheel having an integrated gas bag module is provided as set forth in the preamble of claim 1 wherein a plurality of seats for one coil spring each are arranged on the steering wheel body opposite the outer rim portion of the mounting plate, the latter being spring supported by these coil springs on the steering wheel body. Due to the coil springs being arranged opposite the rim portion of the mounting plate, a relatively low profile steering wheel can be achieved despite the gas bag module. Arranging the coil springs on the steering wheel body facilitates in addition preassembly of the vehicle steering wheel.

In a further development it is provided for that the coil springs are each surrounded by an insulating bush guided slidingly shiftable in the corresponding seat of the steering wheel body and preferably clip-mounted therein, thus creating by simple means a reliable insulation of the coil springs and the steering wheel body relative to the mounting plate whilst reliably retaining the coil springs in the support.

Advantageously the insulating bush comprises on its end face facing the mounting plate a protrusion engaging a corresponding indentation in the rim portion of the mounting plate. By simply placing and latching the protrusion of the insulating bush in place in the indentation of the mounting plate, the latter is thus aligned without the need of additional devices or components so that fitting it is possible with no problem.

It is likewise of advantage that the housing body comprises a base to which the inflator and gas bag are secured as well as a peripheral wall protruding perpendicular to the base, this peripheral wall adjoining a cylindrical wall outwardly surrounding the folded gas bag and integrally connected to the cover, and that the mounting plate forms a flange emanating radially from the peripheral wall of the housing body, with counter-abutment and latching faces cooperating with the abutment and latching faces of the spring elements being provided on the flange. In this way a vehicle steering wheel structure is provided which is rugged, easy to manufacture and easy to install.

In yet a further development of the invention it is provided for that the complete housing body together with the mounting plate is electrically insulated from the steering wheel body. Insulating the complete housing body saves an insulated arrangement of the horn contact on the mounting plate which is especially of advantage in the case of several electrical contacts being provided on the mounting plate.

It is furthermore of advantage that the horn contact is formed by an impression on the radial outer edge of the flange, a horn contact configured as such saving an additional contact element.

In conclusion it is of advantage when the mounting plate comprises at its outer periphery a rim portion cranked towards the cover, the horn contact being arranged on this rim portion. Shaping the mounting plate in this way facilitates adapting to the generally dished shape of the steering wheel. By arranging the horn contacts in the rim portion of the mounting plate contact closure is also ensured even when the mounting plate, on manual actuation, is shifted on one side only.

BRIEF DESCRIPTION OF THE DRAWING

Further features and advantages of the invention read from the following description and the drawing to which reference is made and in which the sole Figure is a section view of a vehicle steering wheel in accordance with the invention.

DESCRIPTION OF THE PREFERRED EMBODIMENT

Secured by a nut 14 to a steering column 10 is a steering wheel body 12. A gas bag module 16 comprises a metallic housing body 18 as well as an inflator 20, a folded gas bag 22 and a cover 24 connected to each other by the housing body. The housing body 18 comprises a base 26 to which the inflator 20 and gas bag 22 are secured. Protruding perpendicular from the base 26 is a peripheral wall 28 adjoining a cylindrical wall 30 outwardly surrounding the folded gas bag 22 and integrally connected to the cover 24. Emanating radially from the peripheral wall 28 of the housing body 18 is a flange 32 forming the mounting plate 34. The mounting plate 34 comprises on its outer periphery a rim portion 36 cranked towards the cover 24. The mounting plate 14 is an integral component of the housing body 18 and thus a component of the gas bag module 16. Serving to secure the mounting plate 34 to the steering wheel body 12 are guiding and fastener studs 38 protruding from the rear side of the steering wheel body 12 through corresponding holes 40 in the steering wheel body 12. Provided in the mounting plate 34 are threaded bushes 42 for securing the studs 38. The studs 38 comprise a conical head which together with a corresponding support in the steering wheel body 12 serve as a stop. The studs 38 are also provided with an electrically insulating sleeve 44, the outer diameter of which is smaller than the diameter of the hole 40 so that the studs 38 can move in the hole 40 with a clearance and, more particularly, cannot get jammed. Since also the conical head of the studs 38 is moved out of its fit in the steering wheel body 12 when the horn is manually actuated resulting in the mounting plate 34 being shifted towards the steering wheel body 12, any displacement of the mounting plate 34 is opposed only by the force applied by the coil springs 46.

In the fitted condition of the vehicle steering wheel the mounting plate 34 is pretensioned away from the steering wheel body 12 by coil springs 46. As a result of this, the conical head of the stud 38 is located in the corresponding seat of the steering wheel body 12 so that the mounting plate 34 and thus the housing body 18 and the gas bag module 16 are reliably held in place, preventing them from rattling when the vehicle is on the move. The coil springs 46 are arranged in seats of the steering wheel body 12 located opposite the outer rim portion of the mounting plate 34. The coil springs 46 are, relative to the steering column 10, radially outwardly offset compared to the studs 38 and are separately arranged therefrom. Consequently, for fitting the steering wheel, the studs 38 need not to be threaded into the coil springs 46. Each coil spring 46 is surrounded by an insulating bush 48 guided slidingly shiftable in the corresponding seat of the steering wheel body 12 and clipped into place therein. The insulating bush 48 comprises on its end face facing the mounting plate 34 a protrusion 50. This protrusion 50 engages a corresponding indentation 52 in the rim portion 36 of the mounting plate 34 and facilitates orienting the mounting plate 34 during fitting.

In the rim portion 36 of the mounting plate 34 a further indentation is provided which forms a horn contact 54. When the mounting plate 34 is moved towards the steering wheel body 12 by manual pressure applied to the cover against the force exerted by the coil springs 46, the horn contact 54 comes into contact with a corresponding mating contact 56 arranged on the steering wheel body 12, as a result of which, for example, a circuit in the electric horn is closed. As soon as the pressure exerted by the hand of the driver on the cover 24 is diminished the coil springs 46 return the mounting plate 34 and thus the housing body 18 and the gas bag module 16 along with the cover 24 back to the starting position so that the contacts 54 and 56 are again open.

What is claimed is:

1. A vehicle steering wheel comprising: a steering wheel body, an integrated gas bag module having an inflator, a folded gas bag and a cover connected to each other by a metallic housing body, a mounting plate having at least one electrically insulated horn switch contact, and a plurality of coil springs for spring supporting said mounting plate on the steering wheel body, said mounting plate carrying said gas bag module whilst being an integral component of said housing body and thus a component of said gas bag module, wherein a plurality of seats for one coil spring each are arranged on said steering wheel body opposite an outer rim portion of said mounting plate, said mounting plate being spring supported by said coils springs on said steering wheel body.

2. The vehicle steering wheel as set forth in claim 1, wherein each one of said coil springs is surrounded by an insulating bush guided slidingly shiftable in a corresponding seat of said steering wheel body, said insulating bush being preferably clip-mounted in said seat.

3. The vehicle steering wheel as set forth in claim 2, wherein said insulating bush has on its end face facing said mounting plate a protrusion engaging a corresponding indentation in said rim portion of said mounting plate.

4. The vehicle steering wheel as set forth in claim 1, wherein said housing body has a base to which said inflator and said gas bag are secured as well as a peripheral wall protruding perpendicular to said base, said peripheral wall adjoining a cylindrical wall outwardly surrounding said folded gas bag, said cylindrical wall being integrally connected to said cover, and wherein said mounting plate forms a flange emanating radially from said peripheral wall of said housing body.

5. The vehicle steering wheel as set forth in claim 1, wherein said complete housing body together with said mounting plate is electrically insulated from said steering wheel body.

6. The vehicle steering wheel as set forth in claim 5, wherein said housing body has a peripheral wall, said mounting plate forms a flange emanating radially from said peripheral wall of said housing body and said horn contact is formed on the radial outer edge of said flange.

7. The vehicle steering wheel as set forth in claim 5, wherein said housing body has a peripheral wall, said mounting plate forms a flange emanating radially from said peripheral wall of said housing body and said horn contact is secured to the radial outer edge of said flange.

8. The vehicle steering wheel as set forth in claim 5, wherein said housing body has a peripheral wall, said mounting plate forms a flange emanating radially from said peripheral wall of said housing body and said horn contact is formed by an impression on the radial outer edge of said flange.

9. The vehicle steering wheel as set forth in claim 1, wherein several guiding and fastener studs protrude from the rear side of said steering wheel body through corresponding holes in said steering wheel body and are secured to said mounting plate.

10. The vehicle steering wheel as set forth in claim 9, wherein said guiding and fastener studs are screwed to said mounting plate and. comprise on the rear side of said steering wheel body a widened head acting as a stop.

11. The vehicle steering wheel as set forth in claim 1, wherein said mounting plate comprises on its outer periphery a rim portion cranked towards said cover, said horn contact being arranged on said rim portion.

12. The vehicle steering wheel as set forth in claim 1, wherein said coil springs are separately arranged from said studs and spaced apart therefrom.

* * * * *

UNITED STATES PATENT AND TRADEMARK OFFICE
CERTIFICATE OF CORRECTION

PATENT NO. : 6,086,090
DATED : July 11, 2000
INVENTOR(S) : Anton Fischer

It is certified that error appears in the above-indentified patent and that said Letters Patent is hereby corrected as shown below:

Column 3, Line 47, change "spring" to "resiliently"

Signed and Sealed this

First Day of May, 2001

Attest:

NICHOLAS P. GODICI

Attesting Officer    Acting Director of the United States Patent and Trademark Office